United States Patent
Brandt, Jr.

(10) Patent No.: US 6,640,158 B1
(45) Date of Patent: Oct. 28, 2003

(54) FILLING APPARATUS WITH FEED DIVERTER

(76) Inventor: Robert O. Brandt, Jr., 541 Wayne Dr., Wilmington, NC (US) 28403

(*) Notice: Subject to any disclaimer, the term of this patent is extended or adjusted under 35 U.S.C. 154(b) by 7 days.

(21) Appl. No.: 10/108,799

(22) Filed: Mar. 27, 2002

(51) Int. Cl.[7] ............................................. G06F 17/00
(52) U.S. Cl. ..................... 700/240; 222/55; 198/358; 198/370.05; 198/528; 198/532; 177/16; 177/116; 177/119; 177/145; 177/25.11
(58) Field of Search .................. 700/231, 240, 700/244; 198/348, 358, 359, 369.2, 370.05, 523, 524, 525, 528, 532, 539; 222/55; 177/14, 15, 16, 25.11, 60, 116, 119, 145

(56) References Cited

U.S. PATENT DOCUMENTS

| | | |
|---|---|---|
| 3,139,217 A | 6/1964 | Mell |
| 3,494,507 A | 2/1970 | Ricciardi |
| 3,521,426 A | 7/1970 | Evins |
| 3,960,225 A | 6/1976 | Hyer et al. |
| 4,402,349 A | 9/1983 | Engert et al. |
| 4,538,693 A * | 9/1985 | Klopfenstein et al. ... 177/25.18 |
| 4,867,343 A | 9/1989 | Ricciardi et al. |
| 5,022,444 A | 6/1991 | Kendall et al. |
| 5,219,031 A | 6/1993 | Brandt, Jr. |
| 5,230,251 A | 7/1993 | Brandt, Jr. |
| 5,345,748 A | 9/1994 | Powell, Jr. |
| 5,376,798 A | 12/1994 | Pettit |
| 5,765,655 A | 6/1998 | Tatsuoka |
| 5,804,772 A * | 9/1998 | Wooldridge et al. ........ 177/116 |
| 5,834,707 A | 11/1998 | Wirth |
| 5,957,773 A | 9/1999 | Olmsted et al. |
| 6,066,809 A | 5/2000 | Campbell et al. |
| 6,257,447 B1 | 7/2001 | Schlienger et al. |
| 6,271,485 B1 * | 8/2001 | Richardson et al. ..... 177/25.18 |
| 6,285,918 B1 | 9/2001 | Kono |

* cited by examiner

Primary Examiner—Khoi H. Tran
(74) Attorney, Agent, or Firm—MacCord Mason PLLC

(57) ABSTRACT

An apparatus for packaging solid particulate material is described that includes a deflectable, curved weigh pan with a given radius of curvature to receive a continuous flow of material and discharge the material along a first discharge pathway, the radius of curvature at the inlet end being substantially perpendicular to the feed pathway; a pivotal material flow diverter adjacent having an inlet end adjacent the pan outlet end, the diverter having a lowered position beneath the first discharge pathway, and a raised position intersecting the first discharge pathway; a transducer for continually measuring pan deflection; a controller to receive deflection measurements from the transducer and transmit an actuation signal when a target weight of material has crossed the pan; and an actuator to pivot the diverter between the first and second positions upon receipt of an actuation signal from the controller.

20 Claims, 3 Drawing Sheets

FILLING APPARATUS WITH FEED DIVERTER

BACKGROUND OF THE INVENTION (1) Field of the Invention

The present invention relates generally to an apparatus for feeding a continuous stream of material into a plurality of packages or other receptacles, and in particular to an apparatus for measuring the weight of material being fed and diverting the material stream from a first pathway to a second pathway when a predetermined weight of material is measured.

(2) Description of the Prior Art

Numerous solid particulate materials are packaged in receptacles for sale to the ultimate consumer or to a downstream processor. A brief exemplary listing of such materials include plastic and metal components and parts; food items, such as cereals, corn meal, rice, spices, soybeans, and potato chips; and a variety of other materials, such as tobacco, plastic pellets, etc. Exemplary receptacles include boxes, containers, pouches, packages, cartons, and bags.

Generally, the material is fed as a continuous or discontinuous feed from a bulk supply source, such as a hopper, directly into the receptacles, or into intermediate collection hoppers for transfer into the receptacles. The apparatus used to transfer the material from the supply source into the individual receptacles may vary dependent upon the type of material, but will normally include a means for weighing the material at some point between the supply source and the receptacle or within the actual receptacle, with some feedback being provided to control the feed rate, and thereby the amount of material being fed into a given receptacle during a given time period. Control of the feed rate is used not only for material packaged by weight, but also for items packaged by the number of items, since these latter items are frequently packaged on the basis of the weight of the number of items in a package, as opposed to counting the number of items packaged.

In some types of apparatus used to discharge material into a plurality of receptacles, a continuous stream of the material is fed from a bulk supply source, such as a bulk hopper onto a weigh conveyor, and then discharged from the conveyor along a first pathway into a first receptacle. The weight of material conveyed into the first receptacle is measured, either by weighing the amount of material being conveyed, or the weight of the receptacle. When the desired weight is reached, the material stream is diverted along a second pathway, e.g., by a diverter, to feed the stream into a second receptacle. Alternatively, the first and second streams can be fed into intermediate hoppers with the material within a hopper being discharged into a receptacle when the desired weight has been reached. In many instances, a weigh conveyor is used to measure the weight of material being carried on the conveyor during a given time, thereby indicating the weight of material fed to the receptacle.

For production efficiency, some materials are fed continuously at a high rate of feed, with up to the order of 600 packages per minute being filled. Unfortunately, existing filling systems do not measure the material with a high degree of accuracy, particularly at these higher feed volumes. Additionally, mechanisms currently used to divert a stream from one pathway to another do not respond at these speeds with sufficient rapidity to accurately fill the receptacles with the correct weight of material. Therefore, there is a continuing need for an apparatus for accurately dispensing solid particulate material from a bulk supply source into a plurality of receptacles based on the weight of the material being dispensed.

SUMMARY OF THE INVENTION

The present invention addresses this need by providing an improved apparatus for continuously and accurately weighing a continuous feed of solid particulate material, and rapidly diverting the stream of material from a first pathway to a second pathway, and thereby from a first receptacle to a second receptacle, responsive to the measurement of a target weight. Generally, the present invention is comprised of a dynamic measurement device in combination with a stream diverter and control circuitry to rapidly actuate the diverter in response to weight measurements. Particularly suitable dynamic measurement devices are described in earlier U.S. Pat. No. 5,219,031, issued Jun. 15, 1993, and U.S. Pat. No. 5,230,251, issued Jul. 27, 1993, to the present inventor. The apparatus may also include means to control material feed and/or receptacle positioning responsive to weight or material flow measurements.

Generally, the dynamic measurement device is comprised of a curved weigh pan having inlet and outlet ends, and an inwardly curved surface extending between the pan ends. The pan is positioned to receive a continuous stream of solid particulate material tangentially at the inlet end, i.e., the material stream is directed substantially perpendicular to the radius of curvature of the pan at the upper end. As a result, the material flows around the curved surface of the pan without impacting the pan, eliminating errors due to the movement of the pan under impact forces.

The pan is mounted on the distal end of an elongated support arm, with the proximal end of the arm being attached to a suitable support at a distance from the pan. To permit pan displacement, the arm is either flexible or is pivotally attaching at its proximal end. When material flows over the inwardly curved pan, an inward centripetal force, and a corresponding outward force, is exerted causing the pan to move outwardly. This outward movement, corresponding to the weight, or change in weight, of the material moving across the pan is measured by the displacement measurement instrument. A displacement measurement instrument, such as a transducer, is positioned to measure the displacement of the pan.

Since the outward force exerted against the pan is due entirely to the centripetal force, and is independent of any impact or frictional forces, measurement is highly accurate, and can be measured instantaneously. For optimal measurement independent of non-centripetal force factors, the pivot point of the arm is preferably located so that a line extending from the arm to the pan approximately midway between the pan inlet and outlet ends is perpendicular to the radius of curvature of the pan.

In the present apparatus, the dynamic measurement device is combined with a material feeder to direct particulate material tangentially along the inner surface of the pan at its inlet end, and a diverter positioned adjacent the outlet end of the pan. Generally, the diverter includes an inner end toward the pan, a pivotal outer end, an upper surface tangentially aligned with the pan surface at pan outer end, preferably along a substantially horizontal plane, and a lower surface that preferably diverges from the inner end of the diverter and includes an inlet end, an outlet end, and a downwardly curved lower surface between the ends.

The diverter includes a diverter actuator to pivot the diverter about its outer end between a lowered position in which the upper surface of the diverter is parallel to the tangent of the outer end of the pan, and a raised position in which the lower surface of the diverter intersects the tangent of the lower end of the pan. The actuator can be a stepping motor, a solenoid, or one of several other devices known to one skilled in the art to be suitable for this purpose, the only requirement being its capability to rapidly pivot the diverter.

When the diverter is in the lowered position, material discharged from the pan will pass along a first pathway over, and preferably in contact with, the upper surface of the diverter. However, when the diverter is raised, the material flows across the lower surface of the diverter and along a second pathway. When in the raised position, the inner end of the diverter extends slightly above the upper surface of the material stream, so that the material flow is substantially tangential to the radius of curvature of the diverter lower surface at its inlet end, thereby creating a smooth flow of material against the diverter lower surface.

Material flowing along the first and second pathways is received by material receptacles positioned along the pathways. The material receptacle may be the final receptacle, with a new receptacle being positioned within the pathway upon completion of filling of a given receptacle. For example, a series of receptacles may be moved on a conveyor beneath a pathway. The conveyor may move intermittently or continuously. Alternatively, the material receptacle can be an intermediate hopper that is filled with material that is later discharged into the final receptacle when the desired amount is in the hopper.

In order to achieve the desired level of fill accuracy, the amount of material flowing along a given pathway, either the first or second pathway, during a given time must be accurately measured, and the material flow must be rapidly switched from the given pathway to the other pathway when a predetermined amount of material has been discharged. This result is achieved by comparing measured weight, determined by pan displacement over time, against a predetermined target weight. Generally, the apparatus includes a controller or processor to receive displacement information from the transducer or other displacement measurement instrument. The controller then calculates the cumulative weight of material fed over the pan and transmits a signal when a target weight is reached.

In operation, a continuous feed of solid particulate material is directed onto the weight pan tangential to the pan inlet end. The material moving across to pan surface is discharged from the pan outlet end along a first pathway across the upper surface of the diverter. As the material moves across the pan, the pan is deflected slightly outwardly by centripetal force. This deflection is measured by the transducer or other deflection measurement instrument. The controller receives measurement information from the deflection measurement instrument, and calculates the cumulative weight of material moving along the first pathway during a given fill sequence.

When a target cumulative weight is reached, the controller signals the actuator to pivot the diverter to the raised position. The actuator then quickly pivots the diverter inner end upwardly through the material stream, causing the stream to flow against the lower surface of the diverter and along a second pathway. Material flow along the second pathway is then undertaken until the target weight is reached, at which time the diverter is pivoted to the lowered position. Material discharged along the first or second pathway is collected into the final receptacles, or into intermediate hoppers. Surprisingly, it has been found that discharge of the material from the curved weigh pan combined with insertion of the adjacent diverter upwardly through the stream results in highly rapid diversion of the stream between pathways, and resulting highly accurate filling of receptacles.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
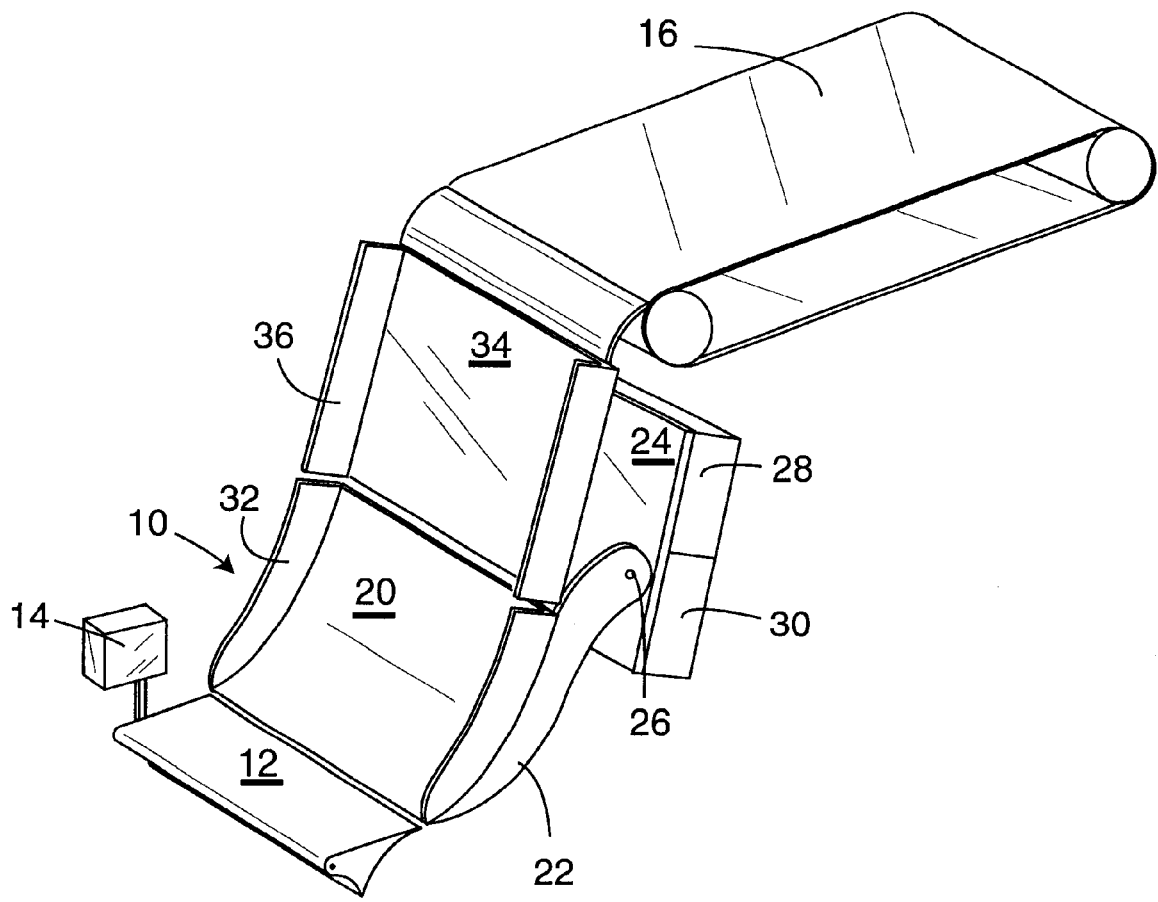
FIG. 1 is a perspective view of the present apparatus.
Figure 2:
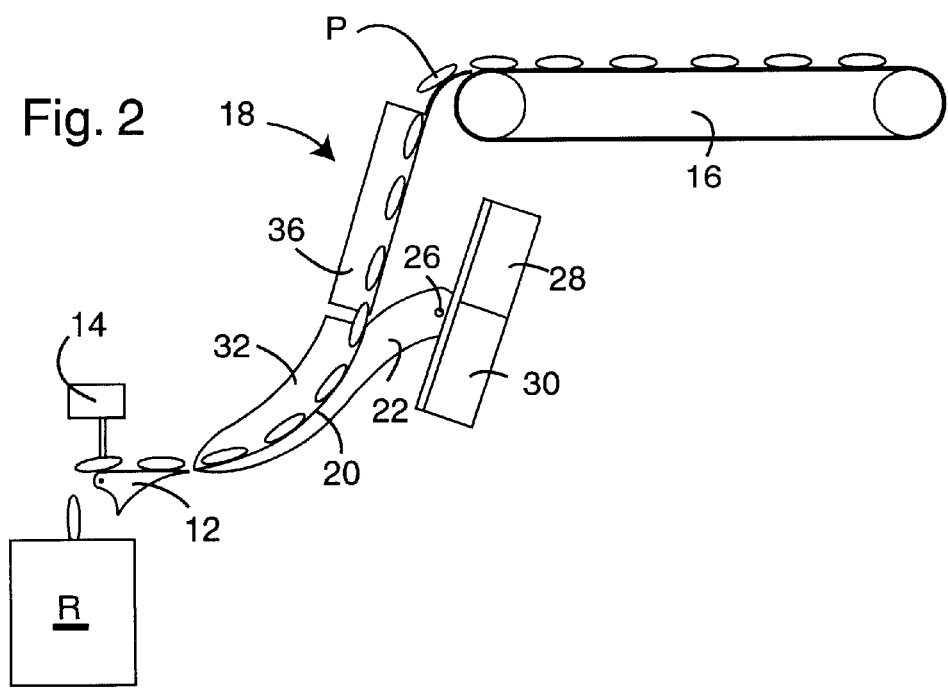
FIG. 2 is a schematic side view of an embodiment of the present apparatus with the diverter in the lowered position.
Figure 3:
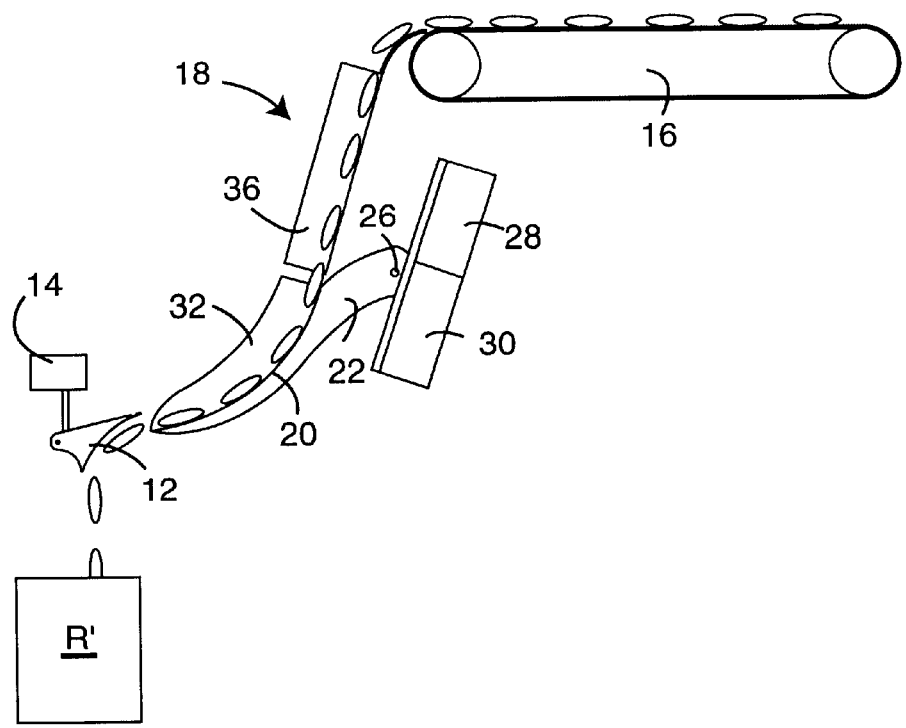
FIG. 3 is a schematic side view of an embodiment of the present apparatus with the diverter in the raised position.

As shown in FIGS. 1–3, the apparatus of the present invention is comprised of a dynamic measurement device, generally 10, a diverter 12, an actuator 14 in communication with diverter 12, a feed conveyor 16, and a material guide 18. Also illustrated in FIGS. 2 and 3 are packets P, representative of a solid material, and a receptacles R and R'.

Measurement device 10 includes a weigh pan 20 with an upper inlet end, a lower outlet end, and a curved upper surface between the ends; and an arm 22 joining pan 20 to a support 24 at pivot point 26. Device 10 further includes a transducer 28 to measure outward movement of pan 20, and controller 30 to receive measurement information from transducer 28 and transmit actuation commands to actuator 14. Pan 20 also includes sidewalls 32 to prevent spillage of material. Preferably, the tangent of the inlet end is at a angle of about 10° C. to about 30° C., e.g., 20° C., from vertical, while the tangent of the outlet end is substantially horizontal.

It will be understood that the locations of actuator 14, transducer 28 and controller 30 are for illustration only, and that any or all of these elements can be located at different locations so long as they were capable of performing their assigned functions. For example, transducer 28 can be in communication with the lower end of pan 20.

Guide 18 includes a floor 34 having a downwardly curved upper end to facilitate receipt of material, and sidewalls 36 to prevent spillage. Guide 18 can also include a cover, not shown, extending between the top edges of sidewalls 36. Floor 34 is preferably at an angle of from about 10° C. to about 30° C. e.g., 20° C., from vertical, with the upper end curving rearwardly toward horizontal. Pan 20 is aligned so that the radius of curvature of pan 20 is substantially perpendicular to the floor 34 at the upper end of pan 20, resulting in tangential entry of material from guide floor 34 onto the upper surface of pan 20. The upper end of guide floor 34 is adjacent the discharge end of feed conveyor 16, so that material, such as packets P, discharged from conveyor 16 will be aligned onto floor 34.

Figure 4:
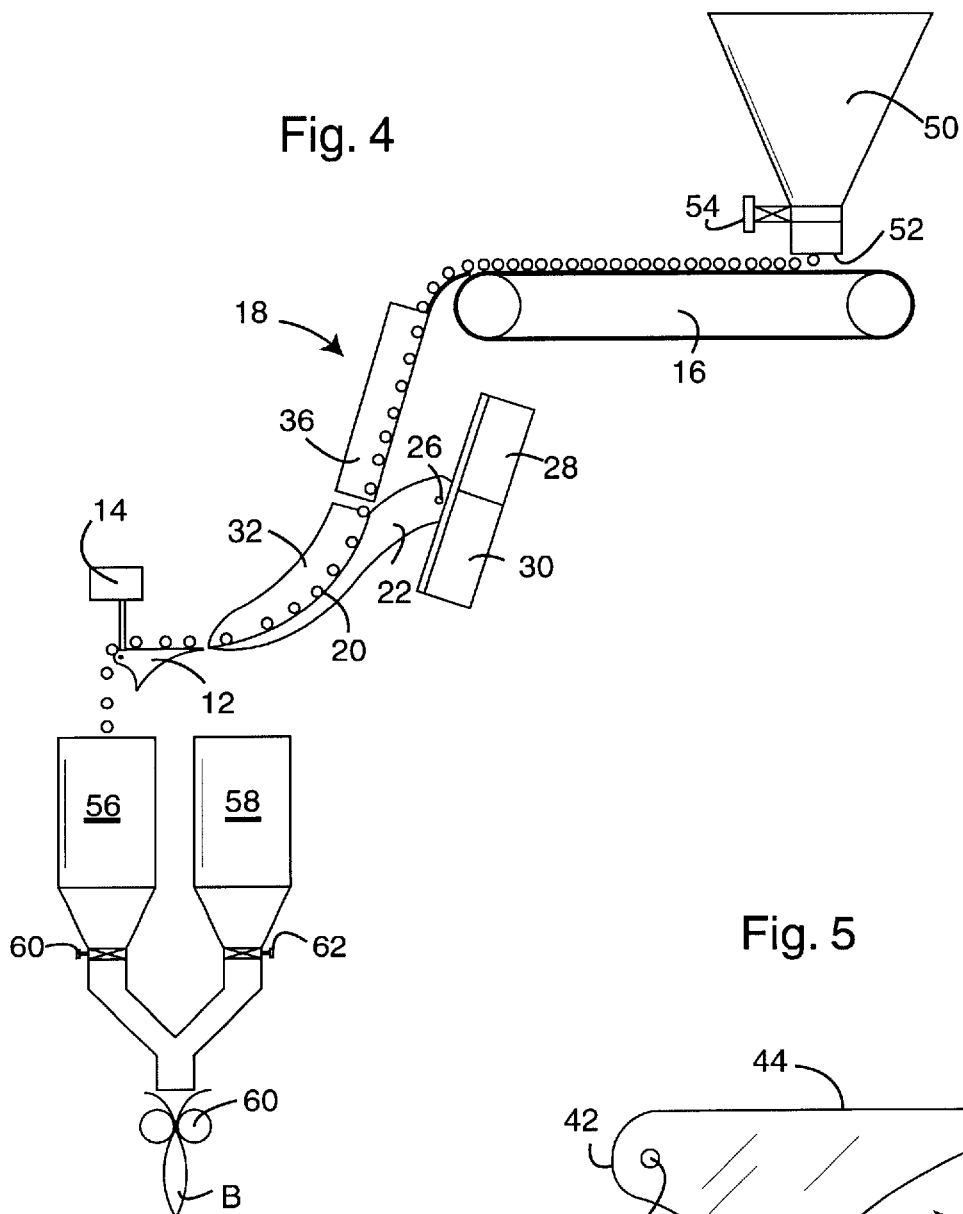
FIG. 4 is a schematic side view of an embodiment of the present apparatus with the diverter in the lowered position, further including a feed hopper and intermediate discharge hoppers.

Diverter 12, also illustrated in detail in FIG. 4, is comprised of an inner end 40 adjacent the discharge end of pan 20, an opposed outer end 42, an upper surface 44, and a curved lower surface 46. Diverter 12 is pivotal at outer end 42 about pivot pin 48 by actuator 14. When in the lowered position as shown in FIG. 1, upper surface 44 is preferably substantially horizontal and aligned with the tangent of the discharge end of pan 20, so that packets P discharged from pan 20 are carried over upper surface 44 and into receptacle R. When pivoted to the raised position as shown in FIG. 2, lower surface 44 is positioned to divert packets P along a second pathway into another receptacle R'.

Figure 5:
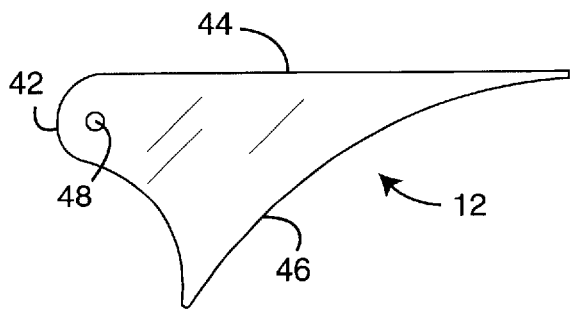
FIG. 5 is a detailed side view of the diverter.

FIG. 4 illustrates a modification of the apparatus of FIGS. 1–3 by the addition of a feed hopper 50 having a discharge end 52 above conveyor 12, and a variable opening gate valve 54. Instead of feeding material directly into final receptacles R and R' as in FIGS. 2 and 3, the apparatus of FIG. 5 is further modified with collection hoppers 56 and 58 having gate valves 60 and 62, respectively. Material M, such as pellets, granules or flakes, is fed alternatively to hoppers 56 and 58, which alternatively discharge material M into final receptacles, in this case bags B formed by continuous bagger 60.

In the operation of the apparatus of FIG. 4, material M is fed from feed hopper 50 onto conveyor 12, from which material M is discharged onto guide 18. Material M exiting guide 18 enters pan 20 along the tangent of the surface of pan 20 at the inlet end, and then moves across the upper surface of pan 20. Material M is discharged from over diverter upper surface 44 into collection hopper 56.

Movement of pan 20 outward by the force of material M, corresponding to the weight of material M, is measured by transducer 28. Controller 30, programmed with a predetermined desired weight, receives measurement information from transducer 28. When the target weight of material M discharged into hopper 56 is reached, as calculated based on displacement of pan 20 over time, controller 30 transmits an actuation signal to actuator 14, which pivots diverter 20 upwardly through the path of material M, diverting the flow of material M against diverter lower surface 46 and into hopper 58. Valve 60 of hopper 56 is opened to discharge the contents of hopper 56 into bag B while hopper 58 is filling. Opening and closing of valves 60 and 62 is in sequence with the actuation of the diverter 20, and is also controlled by actuation signals from controller 30. In addition, controller 30 can control the degree of opening of feed hopper valve 54, and thereby the rate of flow of material across pan 20.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. An apparatus for selectively feeding a stream of material along first and second pathways comprising:
   a) a deflectable, curved weigh pan for receiving a continuous flow of material and discharging the material along a first pathway;
   b) a material flow diverter having a lowered position beneath said first pathway, and a raised position intersecting said pathway, said diverter including a lower surface to engage said material and divert said material to a second pathway when said diverter is in the raised position;
   c) a deflection measurement means for continually measuring the deflection of said pan;
   d) a controller to receive deflection measurement information from said measurement means and transmit an actuation signal when a given weight of material corresponding to a target weight has crossed said pan; and
   e) an actuator to move said diverter between said first and second positions responsive to receipt of an actuation signal from said controller.

2. The apparatus of claim 1, wherein said pan includes an upper end, a lower end, and a curved surface having a given radius of curvature between said ends, said material being fed onto the inlet end of said pan substantially perpendicular to the radius of curvature of said pan at said inlet end.

3. The apparatus of claim 1, wherein said deflection measurement means is a transducer.

4. The apparatus of claim 1, further including a support arm with a pivotally attached proximal end and a distal end, said pan being supported on the distal end of said arm.

5. The apparatus of claim 1, further including a material feed for feeding material to the inlet end of said pan.

6. The apparatus of claim 1, wherein said diverter has a proximal end and a distal end, said diverter being pivotal about its proximal end, with said distal end being toward the exit end of said pan.

7. The apparatus of claim 1, further including a first material collection hopper within said first pathway and a second material collection hopper within said second pathway.

8. The apparatus of claim 1, further including a guide plate having an inlet end for receiving said material, and an outlet end adjacent to and substantially in a plane with the inlet end of said pan.

9. An apparatus for selectively feeding a stream of material along first and second pathways comprising:
   a) a deflectable, curved weigh pan having an upper inlet end for receiving a continuous flow of material, a lower outlet end for discharging the material along a first pathway, and an inwardly curved surface having a given radius of curvature between said inlet and outlet ends;
   b) a material flow diverter adjacent having an inlet end adjacent said pan outlet end and a pivotal outer end, said diverter having a lowered position beneath said first pathway, and a raised position intersecting said pathway, said diverter including a lower surface to engage said material and divert said material to a second pathway when said diverter is in the raised position;
   c) a deflection measurement means for continually measuring the deflection of said pan;
   d) a controller to receive deflection measurement information from said measurement means and transmit an actuation signal when a given weight of material corresponding to a target weight has crossed said pan; and
   e) an actuator to pivot said diverter about said diverter outer end between said first and second positions responsive to receipt of an actuation signal from said controller.

10. The apparatus of claim 9, wherein said deflection measurement means is a transducer.

11. The apparatus of claim 9, further including a support arm with a pivotally attached proximal end and a distal end, said pan being supported on the distal end of said arm.

12. The apparatus of claim 9, further including a material feed for feeding material to the inlet end of said pan substantially perpendicular to the radius of curvature of said pan at said inlet end.

13. The apparatus of claim 9, further including a first material collection hopper within said first pathway and a second material collection hopper within said second pathway.

14. The apparatus of claim 9, further including a guide plate having an inlet end for receiving said material, and an outlet end adjacent to and substantially in a plane with the inlet end of said pan.

15. An apparatus for selectively packaging solid particulate material comprising:
   a) a solid particulate material feeder having a feeder discharge end;
   b) a material guide having a guide inlet end and a guide discharge end for guiding material from said feeder along a feed pathway;
   c) a deflectable, curved weigh pan having an upper inlet end for receiving a continuous flow of material along said feed pathway, a lower outlet end for discharging the material along a first discharge pathway, and an inwardly curved surface having a given radius of curvature between said inlet and outlet ends, the radius of curvature at said inlet end being substantially perpendicular to said feed pathway;
   d) a material flow diverter adjacent having an inlet end adjacent said pan outlet end and a pivotal outer end, said diverter having a lowered position beneath said first discharge pathway, and a raised position intersecting said pathway, said diverter including a planar substantially horizontal surface tangential to sand pan outlet end when said diverter is in the lowered position, and a curved lower surface to engage said material and divert said material along a second discharge pathway when said diverter is in the raised position;
   e) a transducer for continually measuring the deflection of said pan;
   f) a controller to receive deflection measurement information from said measurement means and transmit an actuation signal when a given weight of material corresponding to a target weight has crossed said pan; and
   g) an actuator to pivot said diverter about said diverter outer end between said first and second positions responsive to an actuation signal from said controller.

16. The apparatus of claim 15, wherein said feed pathway is at an angle of from about 10° to about 30° from vertical, and said material is discharged substantially horizontally from said pan outlet.

17. The apparatus of claim 15, wherein said pan is deflected from a pivot point positioned along a line perpendicular to the radius of curvature of said pan approximately midway between said pan inlet and outlet ends.

18. The apparatus of claim 15, wherein said material feeder is a conveyor.

19. The apparatus of claim 15, further including a first collection hopper along said first discharge pathway and a second collection hopper along said second discharge pathway.

20. The apparatus of claim 15, wherein said controller is further adapted to control the feed of said material to said pan.

* * * * *